(12) United States Patent
Walldeen et al.

(10) Patent No.: US 8,693,469 B2
(45) Date of Patent: Apr. 8, 2014

(54) CALL HANDLING IN A MOBILE COMMUNICATIONS NETWORK

(75) Inventors: Thomas Walldeen, Linköping (SE); Jari Vikberg, Järna (SE); Tomas Nylander, Värmdo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 676 days.

(21) Appl. No.: 12/595,146

(22) PCT Filed: Apr. 26, 2007

(86) PCT No.: PCT/SE2007/050274
§ 371 (c)(1),
(2), (4) Date: Oct. 8, 2009

(87) PCT Pub. No.: WO2008/133558
PCT Pub. Date: Nov. 6, 2008

(65) Prior Publication Data
US 2010/0061328 A1     Mar. 11, 2010

(51) Int. Cl.
*H04L 12/50*      (2006.01)
*H04L 12/66*      (2006.01)
*H04L 29/06*      (2006.01)
*H04L 12/28*      (2006.01)

(52) U.S. Cl.
CPC ............. *H04L 12/50* (2013.01); *H04L 12/2869* (2013.01); *H04L 29/06278* (2013.01)
USPC ............ 370/360; 370/338; 370/355; 370/357

(58) Field of Classification Search
CPC ...................................................... H04L 12/50
USPC ................................. 370/338, 355, 357, 360
See application file for complete search history.

(56) References Cited

U.S. PATENT DOCUMENTS

2004/0157600 A1* 8/2004 Stumpert et al. ............ 455/432.1
2007/0206735 A1* 9/2007 Silver et al. ................. 379/88.19

FOREIGN PATENT DOCUMENTS

WO     WO 2006126923 A1     11/2006

* cited by examiner

*Primary Examiner* — Kenny Lin (57) ABSTRACT

The present invention relates to a network node arrangement comprising a server node adapted to handle control signaling for circuit switched calls and being connected to a gateway node adapted to handle user plane traffic under control of said server node, said server node further being adapted to control connections between mobile stations over a radio network. The server node is adapted to, for a first and second call leg of a requested call connection between a first mobile station and a second mobile station, provide information to the gateway node about radio network node handling the first call leg and the second call leg and circuit information about circuit resources for said first and second call legs. The gateway node comprises analyzing means adapted to detect if for the requested call the first and second mobile station are handled by a common radio network node and, if yes in generation means generate, and provide, interconnection information in a message to the server node including information about channel or circuit resources. The server node is adapted to forward interconnection information to the radio network node such that switching of user plane traffic can be controlled to take place in a common radio network node or in the gateway node.

22 Claims, 9 Drawing Sheets

CALL HANDLING IN A MOBILE COMMUNICATIONS NETWORK

TECHNICAL FIELD

The present invention relates to handling of calls in a mobile communication system, particularly to enable optimized switching of user plane traffic. Particularly the invention relates to a network node arrangement comprising a server node adapted to handle control signalling for circuit switched calls and being connected to a gateway node adapted to handle user plane traffic under control of said server node, which further is adapted to control connections between mobile stations over a radio network.

BACKGROUND

In a mobile communication system, for example GSM (Global System for Mobile communications) one or more radio access networks (RAN) are connected to a core network (CN). For GSM networks the RAN consists of a BSS (Base Station Subsystem) comprising a number of base station controllers (BSC), each controlling a number of base tranceiver stations (BTS) and serving the mobile stations connected to a number of BTSs. Each BSS (BSC) is connected to a mobile switching center (MSC) over the A-interface and each MSC can serve one or more BSCs. It should be clear that only those parts of the mobile communication system that are of interest for the present invention are discussed. Each BSC in a GSM network is able to control a plurality of radio cells and each BSC interworks with a plurality of BTSs via respective interfaces. Each BTS is in turn responsible for transmission and reception of radio signals over an interface in one or more cells. The BTSs also carry a number of connections or calls between mobile stations (MS) and respective BSCs, each BTS being equipped with a number of transceivers (TRX). In a so called split architecture the MSC is divided into a server node, here also called an MSC server, and a gateway node. The gateway node is connected to the BSS, or a BSC, and handles the user plane traffic of the A-interface, CS (circuit switched) payload, e.g. a number of speech channels. However, also the server node is connected to BSS (BSC), handling the control signalling of the A-interface using the BSS-MAP/DTAP protocols. This is described in 3GPP TS 48.008. The server node and the gateway node communicate over the H.248 protocol. If a 3G access technology (3G, Third Generation) is used, an RNC (Radio Network Controller) provides for the controlling functionality corresponding to that of a BSC. In 3G the BTSs correspond to NodeBs. A common name for GSM BTSs and 3G nodeBs are radio base stations (RBSs). GSM as well as 3G (e.g. UMTS) networks are standardized by 3GPP, Third Generation Partnership Project.

In for example a BSS, all connections for circuit switched services are via the A-interface. For a speech call between two subscribers using radio resources handled by one and the same BSC throughout the call, connections are established for both subscribers from that BSC to the MSC. Particularly, in a split architecture, the user traffic flows of the connections are interconnected in the gateway node. A call or a connection is here seen as consisting of two call legs, one from the first subscriber towards the core network and one between the second subscriber and the core network. A call is set up via the MSC, (in case of split architecture the user plane is handled by the gateway node) since the BSS is not aware of the two call legs belonging to the same call or conversation. This is very disadvantageous in that resources are wasted, transmission costs will be high, the speech call quality will be degraded. The speech call quality is degraded for two reasons; first, increased propagation delay (e.g. if using satellite links), second, multiple coding/decoding of speech (e.g. A-interface is defined as using decoded speech (PCM (Pulse Code Modulation) format). This means that if the two MSs are served by one and the same BSC, payload will be routed between BSC and the gateway node and hardware as well as software resources will be used both in BSC and the gateway node. Particularly two transcoders will be connected in the BSC which will impact the voice quality. To solve some of these problems it has been suggested to introduce logic in the server node to determine if two call legs are controlled by the same radio network controller, particularly BSC, and that knowledge is used to optimize the switching path.

U.S. Pat. No. 6,958,983 shows a solution according to which new messages are introduced on the A-interface. One new message is intended to inform the BSS that call legs identified by the circuit identity codes (CIC) included in the message can be locally connected in the BSS to provide optimal routing of calls. Another message is provided having the purpose to inform the BSS that the original call legs identified by the CICS included in the message should be restored and not anymore locally connected in the BSS. The access network here is an IP based BSS and the first message, join CIC message, includes information elements with information about which CICS and signalling connections belong to a single conversation. This means that the associated call can be switched in an optimal way. The join CIC message is sent from MSC to BSS to inform the BSS that the CICS included in the message can be connected in the BSC. This means that the decision making is done in the server node. The solution is centralized and e.g. not easily adaptable to MSC pooling and shared architectures.

SUMMARY

What is needed is therefore a solution through which unnecessary waste of resources can be avoided and through which switching paths can be optimized. Particularly a solution is needed through which hardware as well as software resources can be saved in core network nodes as well as radio network nodes through the provisioning of appropriate switching of calls. It also an object of the invention to provide a solution through which subscriber connections can be set up in the most appropriate way, particularly when two mobile subscribers use radio resources of one and the same radio network node controlling station, for example a BSC or an RNC. Most particularly it is an object to provide a flexible and simple solution for controlling where switching of user plane traffic is to be done, under which circumstances and for triggering changes. It is also an object of the invention to provide a network node arrangement or a system through which one or more of the above mentioned objects can be achieved. Further it is an object of the present invention to provide a solution that enables optimized transmission of the user payload, particularly controlling when switching of payload is to be performed and initiated in the radio access network. It is also an object of the present invention to provide a method through which one or more of the above mentioned objects can be achieved.

Therefore a system or a network node arrangement is provided which comprises a server node which is adapted to handle control signalling for circuit switched calls and which is connected to a gateway node adapted to handle user plane traffic under control of said server node. The server node is further adapted to control connections between mobile stations over a radio network. According to the invention the server node is adapted to, for a first and second call leg of a requested call or connection (the first and second call leg may also be called a first and second half call) between a first mobile station and a second mobile station, provide information to the gateway node about which radio network node handles the first call leg and which handles the second call leg. The server node is also adapted to provide channel or circuit information about channel or circuit resources used for said first and second call legs. The gateway node comprises analyzing means which are adapted to detect if, for a requested call, the first and second mobile stations are handled by one and the same radio network node (here also called a common radio network node) and generation means adapted to, if the first and second mobile stations are handled by the same radio network node, provide interconnection information in a message to said server node including information about said first and second channels or circuits. The server node is adapted to transparently forward the message to the radio network node and to the gateway node, hence enabling control of user plane traffic switching.

In a particular implementation the server node comprises an MSC server and the gateway node comprises a gateway, in a most particular implementation a so called media gateway. This is relevant for a so called split architecture, most particularly one in which a mobile soft switch (MSS) controls gateways, the base station controllers, and/or radio network controllers (RNC). In a non-split architecture the server node and the gateway functionality are included in one and the same physical node which means that the advantages provided through introduction of the inventive concept will be less apparent.

For a GSM implementation the server node is adapted to control the circuit switched part of the RAN, for example a BSS comprising a number of BSCs, each controlling a number of base stations, particularly base transceiver stations (BTSs). In another implementation, for a 3G radio access network, the server node is also adapted to control the circuit switched part of the RAN, for example a RAN comprising a number of RNCs, each controlling a number of NodeBs.

In one advantageous implementation the server node is adapted to provide information to the gateway node about handling radio network node and channel or circuit resource for the first and second connection terminations or legs of said call in respective messages sent during a call setup procedure.

The information about radio network node preferably comprises identity information, for BSCs the respective BSC identities (correspondingly, for RNCs, the respective RNC identities), and first and second Payload Flow Identifier, PFI, here called CIC1 and CIC2 respectively for BSCs, and for RNCs, e.g. first and second RAB-ID (Radio Access Bearer Identifier).

Preferably the analyzing means of the gateway node are adapted to compare received information about handling radio network node (first BSC id) of the first call leg or connection termination and received information about radio network node handling the second call leg, for example second BSC id, and if they are the same, generate or activate generation of an interconnect message and to provide said message to the server node. The interconnect message particularly comprises or is extended with information about the first and second channel or payload flow resources. The analyzing means of the gateway node are most particulary adapted to trigger generation of the interconnect message at reception of a message from the server node concerning a modification request relating to through-connection. The analyzing means are, in a most preferable implementation, adapted to embed the interconnect message in a reply message to said modification request message from the server node, i.e. in an already existing message, which hence is extended with additional information.

According to the present invention the server node is adapted to transparently transfer the embedded interconnect message to the radio network node identified as common for both call legs. Most particularly the server node is adapted to, for GSM, generate a BSSMAP interconnect message, i.e. send the interconnect message using the BSSMAP protocol (for 3G a RANAP message is generated), and to send it to the radio network node, and, upon reception of a response from the radio network node, transparently transfer the message now indicating interconnected status to the gateway node. The transfer to the gateway node is also done transparently and most particularly it is done e.g. using the H.248 protocol.

The gateway node is particularly adapted to break up a payload connection at or after reception of information that the radio network node is common for a first and a second call leg of a complete call or speech connection. The common radio network node is then adapted to switch payload traffic locally, which is extremely advantageously in that for example no hardware or software resources will be wasted in the gateway node. In a particularly advantageous implementation it will not be necessary to involve any transcoders, if the switching is done before coding/decoding between the format used between mobile station and the BSS and the format used between the BSC and the gateway node of the core network which is extremely advantageous in that it allows for transcoder free operation (TrFO) in the radio network. In an even more advantageous implementation the analyzing means of the gateway node or analyzing means of a common radio network node, are adapted to establish if the first and second call legs are handled by a secondary radio network node common for both call legs and closer to the respective call terminations than the common radio network node and to, in said analyzing means, or in generating means, generate interconnect messages enabling payload switching through such a secondary common radio network node. The secondary radio network node here e.g. comprises a radio base station, for example a BTS, or a NodeB. To summarize, this means that, if also the radio base station or base transceiver station is common for a first and a second mobile station involved in a call to be established, it is actually not necessary to perform the switching locally in the node controlling it (e.g. a BSC) and it is not necessary to let the payload pass through the BSC (or RNC), but it can be switched even further out in the RAN, e.g. in a common BTS or NodeB or between BTS's (NodeB's) in case a packet based RAN based on for example IP is used. In that case the analyzing step can be performed in the gateway node meaning that an interconnect message will have to be provided also to BTS/NodeB. This would however mean that the gateway node would need to know which BTS/NodeB that is used for both call legs and this is normally not the case and would require extensive modifications of existing systems. In a preferred embodiment the comparing or analyzing step is done in the common radio network node, e.g. after the first analyzing step has been done in the gateway node, which means that messages concerning interconnection would have to be provided from BSC to BTS (RNC to NodeB). This can be enabled in different manners, for example it can be done in the radio network node on condition that it is acting as a common radio network node for the performed connection.

In an advantageous implementation a gateway node is adapted to, if it has previously relocated the user plane switching function of a call connection to a common radio network node, e.g. in generation means, generate an interconnect cancellation message including the first and second circuit resources. It is also adapted to send it to the server node after the server node has exchanged signalling information with the radio network node, by transparently forwarding the message, and, to activate or allocate user plane resources. Most particularly a gateway node is adapted to handle both call terminations or call legs, said terminations being kept for the duration of a call. According to the invention a common radio network node, or more generally a radio core network node such as for example a BSC or an RNC, or in a particular implementation as discussed above also a BTS or a NodeB, is adapted to be able to switch traffic locally. It may additionally comprise transcoder disconnecting means for disconnecting transcoder units if mobile user stations are using the same voice coding in combination with local switching. In one particular embodiment a pool of server nodes are arranged in a pool to, in common, control a plurality of radio network nodes. It is advantageous according to the present invention, that there is actually support for MSC pooling functionality which means that a solution is provided which is not affected by for example the number of server nodes in a pool. If the analyzing means is placed in the server node in the MSC pool, only calls with both call legs controlled by the same server node can be locally switched. When having the analyzing means in the gateway nodes, it is possible to achieve local switching for all calls controlled by the same pool. This is possible because multiple server nodes can control the same gateway node.

In other advantageous implementations local switching can be provided for in shared RANs, e.g. a shared RAN with a number of MSC servers, for example one per operator, and a common gateway node.

A method is also provided for handling a call connection between a first and a second mobile station, said call connection comprising a first and a second respective call leg or connection termination, over respective first and second radio network nodes. The method comprises the steps of: providing information about the first radio network node and the second radio network node handling the first and the second call legs respectively of the connection involving a first and a second mobile station, to a core network gateway node in respective request messages; analyzing, in the core network gateway node, if the first and second call legs are handled by the same radio network node, i.e. if the first and second radio network node is common for said first and second call legs; if yes, generating an interconnection information message in the core network gateway node; sending the interconnection information message to the server node; transparently transferring the interconnection information message from the server node to the common radio network node; controlling switching of user plane traffic to be done locally in the common radio network node or in the gateway node depending on the interconnection information.

The information providing step particularly comprises providing a first request message (add request) comprising first radio network node identity for said first call leg; providing a second request (add request) message comprising second radio network node identity for said second call leg. Knowing the radio network node identities, the server node selects free circuit resources for the first and second call legs.

It should be clear that the transparent transfer of the interconnect/interconnected messages from the server node to the common radio network node and from the server node to the core network gateway node generally is not performed at the same time, but a reply to the interconnect message from the radio network node initiates transfer of a message from the server node to the gateway node. Normally the messages are transparently transferred using the appropriate protocols and established control signalling associations from the server node to the radio network node and to the gateway node. Preferably the method comprises the step of generating the second request message upon or after reception of a message from the second mobile station.

Then a modification request message, or modify request message, particularly comprising a modified request message relating to through-connection is generated, and sent, for example using the H.248 protocol. Most preferably the analyzing step is done when the first and second mobile stations, or subscribers, have been connected, particularly when the modify request message (relating to through-connection) has been received in the gateway node.

In an advantageous implementation the method comprises the step of transparently transferring the interconnected message with a first and second circuit identity respectively using an extended message, for GSM e.g. a BSSMAP message extended with BSC-id, CIC, or for 3G e.g. a RANAP message extended with RNC-id, RAB-id, to the common radio network node; providing an extended BSSMAP/RANAP message as a response if the call legs are connected in common radio network node; transparently transferring the interconnected message, i.e. the message indicating that the respective PFI:s have been interconnected, to the gateway node, and switching the user traffic of the call connection in the radio network node. Normally the radio network node does not known when the gateway node receives the "interconnected" message and local switching is activated already when the radio network node receives the "interconnect" message from the server node.

BRIEF DESCRIPTION OF THE DRAWINGS

The invention will in the following be further explained, in a non-limiting manner, and with reference to the accompanying drawings, in which.

DETAILED DESCRIPTION

Figure 1:
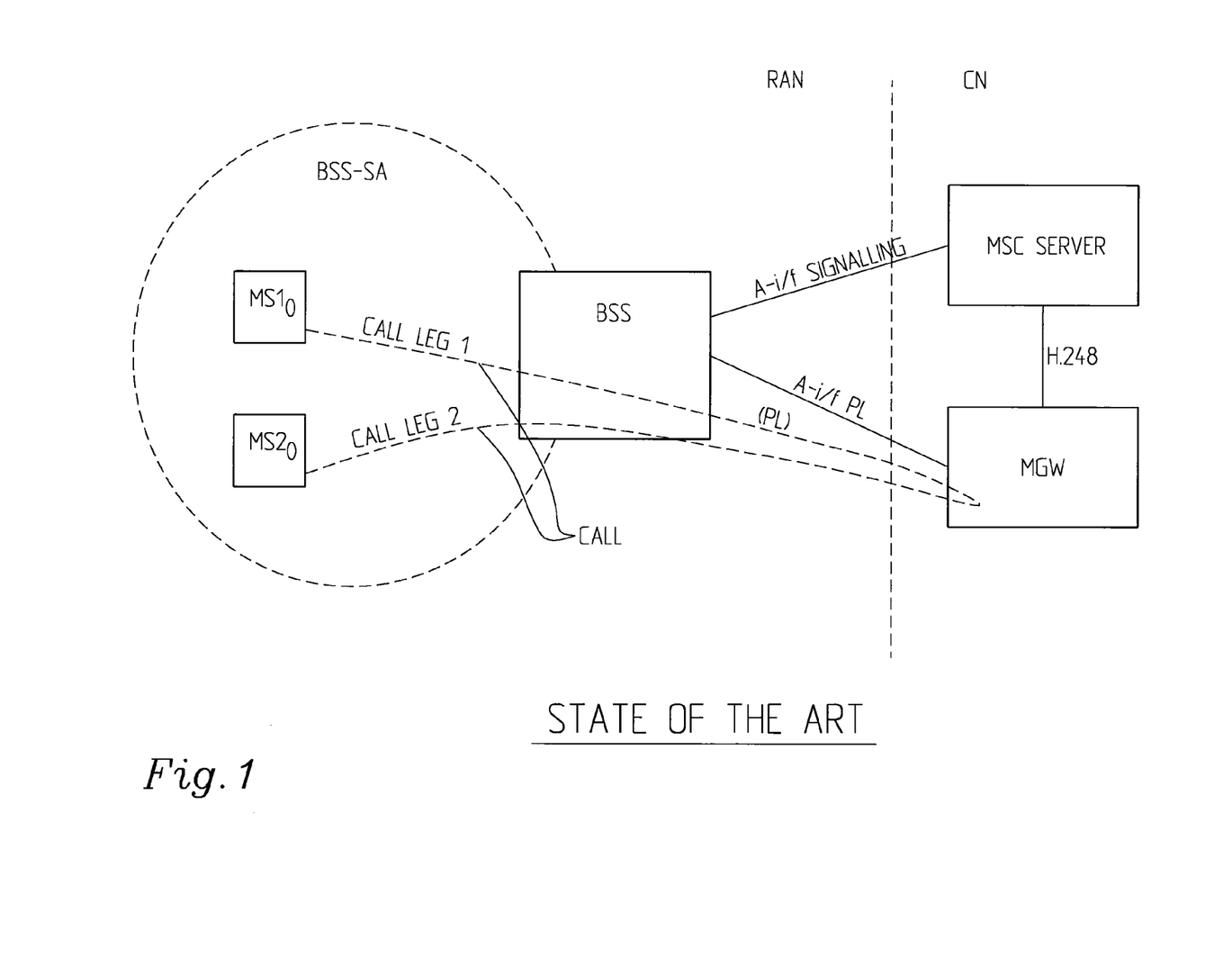
FIG. 1 is a schematical block diagram of a part of a GSM system illustrating switching of payload traffic according to the state of the art.

FIG. 1 shows, as is known from a GSM system, a BSS of a RAN connected to a so called split architecture MSC comprising an MSC server and a media gateway MGW or more generally a gateway node. Here the MGW comprises a pool of interface devices which, when they are allocated, are connected to the A-interface of the respective BSC. The MGW communicates with the MSC server over the H.248 protocol and it is responsible for handling payload (PL) traffic whereas the MSC server handles the A-interface control signalling over BSSMAP/DTAP (BSS Management Application Part/Direct Transfer Application Part (GSM Layer 3 protocol)). BSS here comprises BSCs controlling BTSs as discussed above (not shown). In the figure it is supposed that BSS is responsible for a BSS service area (BSS-SA). For illustrative purposes are shown a first mobile station $MS1_0$ and a second mobile station $MS2_0$. If $MS1_0$ wants to make a call to $MS2_0$, here both actually handled by the same BSS, i.e. using radio resources in the same BSC, according to the state of the art user plane payload connections are established for both subscribers from the BSS to the MGW. The first connection termination between $MS1_0$ and MGW is denoted call leg 1 and the second connection between MGW and $MS2_0$ is denoted call leg 2, both being parts of the same call. This means that a transmission path has to be set up between BSC and MGW, hardware and software resources will be used both in BSC and MGW. Moreover, since different speech coding formats are normally used between the MS and the BSS and the BSS and the MGW respectively, transcoders in the BSC will be connected for encoding/decoding the payload. Currently payload is for example transmitted from $MS1_0$ to BSS as GSM coded voice, for example AMR (Adaptive Multi-Rate) 12.2 Kbps, from BSS to MGW as PCM (Pulse Code Modulated) coded voice, 64 Kbps, and from MGW to BSS as PCM coded voice, 64 Kbps, and finally from BSS to $MS2_0$ as GSM coded voice, for example AMR 12.2 Kbps. The solution is inefficient and involves an unnecessary waste of resources and an unnecessary coding/decoding of voice which impacts the quality of the voice.

Figure 2:
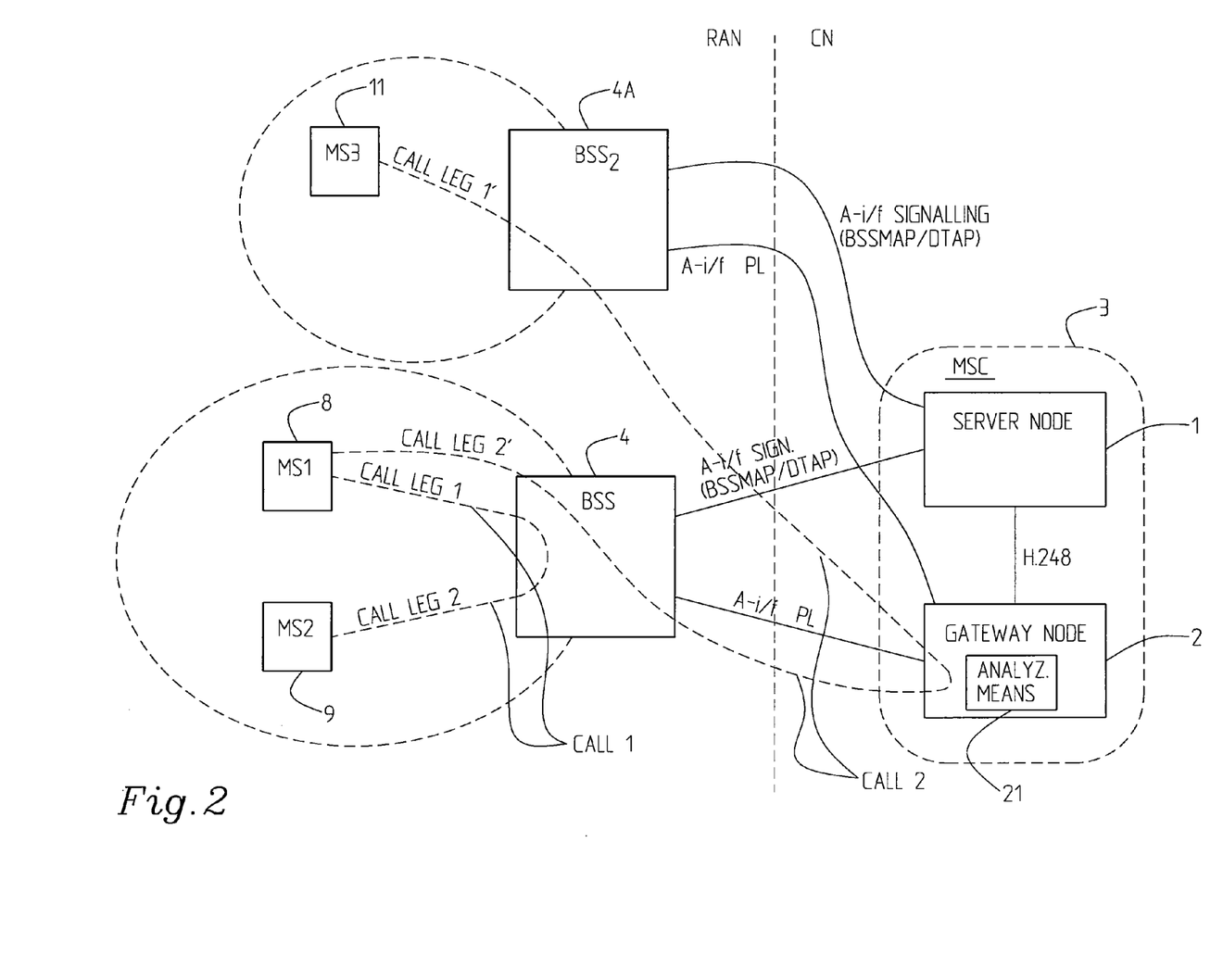
FIG. 2 is a general schematical block diagram schematically illustrating implementation of the inventive concept according to a first embodiment.

FIG. 2 is a block diagram of a first embodiment for implementing the inventive concept in a system as in FIG. 1. It is supposed that a split architecture is used where an MSC 3 comprises a server node 1 and a gateway node 2. BSS 4 serves MS1 8 and MS2 9 whereas another $BSS_2$ 4A serves other mobile stations, here only MS3 11 illustrated. Both BSS 4 and $BSS_2$ 4A communicate with server node 1 using BSSMAP/DTAP protocols and both also communicate with the gateway node 2 over the A-interface for payload traffic. If a call is to be established between MS3 11 served by $BSS_2$ 4A and MS1 8 served by BSS 4, the call will consist of first call leg 1' from MS3 11 over $BSS_2$ 4A to gateway node 2 and second call leg 2' from the gateway node 2 to BSS 4 and to MS1 8. However, if a call is to be setup between MS1 8 and MS2 9 served by one and the same BSS 4 (BSC and BTS not shown herein), according to the invention MS1 8 signals, in a conventional manner, a setup message to server node 1 including information about the identity of MS2 (and inherently of BSS 4). Subsequently server node 1 uses information, the identity of the BSC handling MS1 and finds or selects a channel or the circuit resource CIC1 to be used for the first call leg, adds it to a conventional message and sends it over H.248 to the gateway node. Subsequently, when MS2 9 confirms the call to the server node 1, server node 1 modifies a conventional H.248 request message including the identity of the BSS handling MS2 9 and the circuit or channel resource (selected by the server node as discussed above) used for call leg 2, CIC2.

This means that the gateway node 2 will have knowledge about which BSCs that handle call leg 1 and call leg 2 respectively as well as about which CICS that are used for call leg 1 and call leg 2 respectively. Analyzing means 21 in gateway node 2 then perform an operation to establish if the BSS handling MS1 is the same as the BSS handling MS2. If yes, using conventional signalling, hence here a H.248 message (a response message to a through-connect message from the server node) is extended, e.g. by generation means or by the analyzing means also including a generation functionality, to include information that CIC1 and CIC2 should be interconnected, i.e. an interconnect message including CIC1 and CIC2. This information will then be tunneled in a message over BSSMAP from the server node 1 to BSS 4 which responds with a BSSMAP interconnected message containing information about CIC1 and CIC2 and which then is tunneled over H.248 from server node 1 to gateway node 2. BSS 4 (more particularly BSC) interconnects and can then perform switching of user payload locally. If the same speech coding is used for the two mobile stations, the transcoders can be released as well. When the gateway node receives a message "interconnected", the payload is switched locally in BSC instead and the gateway node can break up the connection and optionally release used resources.

Normally the BSC and the MGW or gateway node do not communicate, but through introduction of signalling between the gateway node and the BSC via the server node, since the server node has established signalling relations both with BSS (BSC) and the gateway node, it is possible for BSC to obtain information that the two call legs belong to the same call and can therefore connect them locally. In the state of the art a BSC has no possibility to understand that the two call legs belong to one and the same call.

According to the invention analyzing means 21, switching path optimization logic, are introduced in the gateway node 2. Normally the analyzing step, for switching optimization, is done when the second mobile station has answered.

Figure 3:
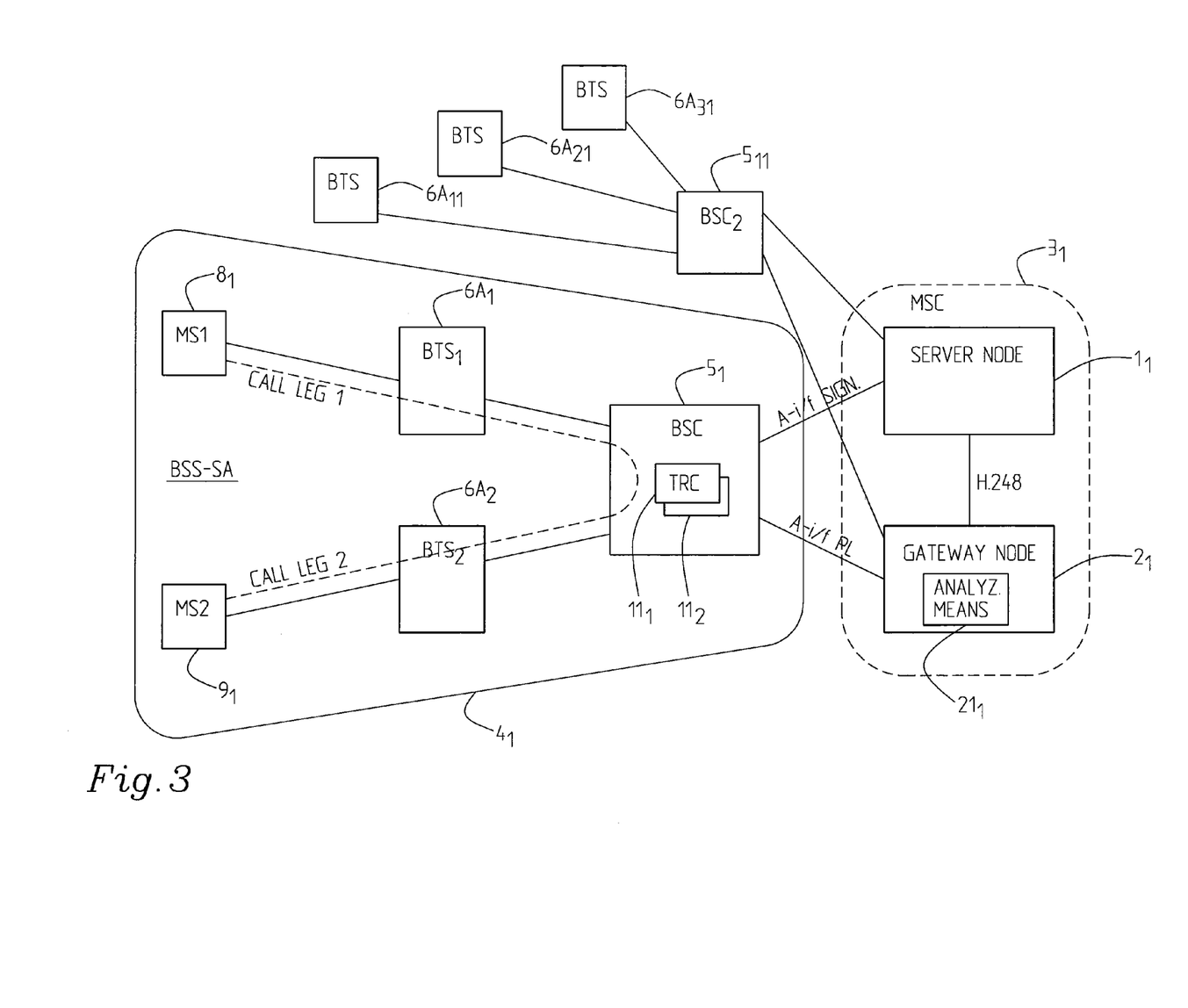
FIG. 3 is a block diagram somewhat more in detail illustrating an embodiment of the present invention.

FIG. 3 shows an embodiment similar to that of FIG. 2 when a split architecture MSC $3_1$ is used comprising a server node $1_1$ and a gateway node $2_1$, communicating by means of the H.248 protocol. The gateway node also here comprises analyzing means $21_1$ and it communicates with a BSC $5_1$ of a BSS handling a service area $4_1$. BSC $5_1$ of course comprises the functionality of a conventional BSC but only the transcoder units TRC $11_1$, $11_2$ are illustrated. Also in a conventional manner BSC 1 $5_1$ controls base transceiver stations $BTS_1$ $6A_1$ and $BTS_2$ $6A_2$. MS1 $8_1$ is handled by $BTS_1$ and MS2 $9_1$ is handled by $BTS_2$. It should be clear that a BSC handles a plurality of BTSs which in turn act as radio base stations for a plurality of MSs; this is merely illustrated by one additional $BSC_2$ $5_{11}$ serving BTSs $6A_{11}$, $6A_{21}$, $6A_{31}$.

If a call connection is to be established between MS1 $8_1$ and MS2 $9_1$ the signalling will be the same as described above with reference to FIG. 2 and more thoroughly described in the sequence diagram in FIG. 7 below. If it is identified that one and the same BSC $5_1$ handles the first call leg and the second call leg, a local switching path will be set up via BSC $5_1$ (when the path is transparently through-connected through the gateway; otherwise it is still routed through the gateway node). If the same speech coding is used for MS1 $8_1$ and MS2 $9_1$, it is illustrated how the call will be switched before the TRCs $11_1$, $11_2$, which means that no coding/decoding is needed, which is extremely advantageous.

Figure 4:
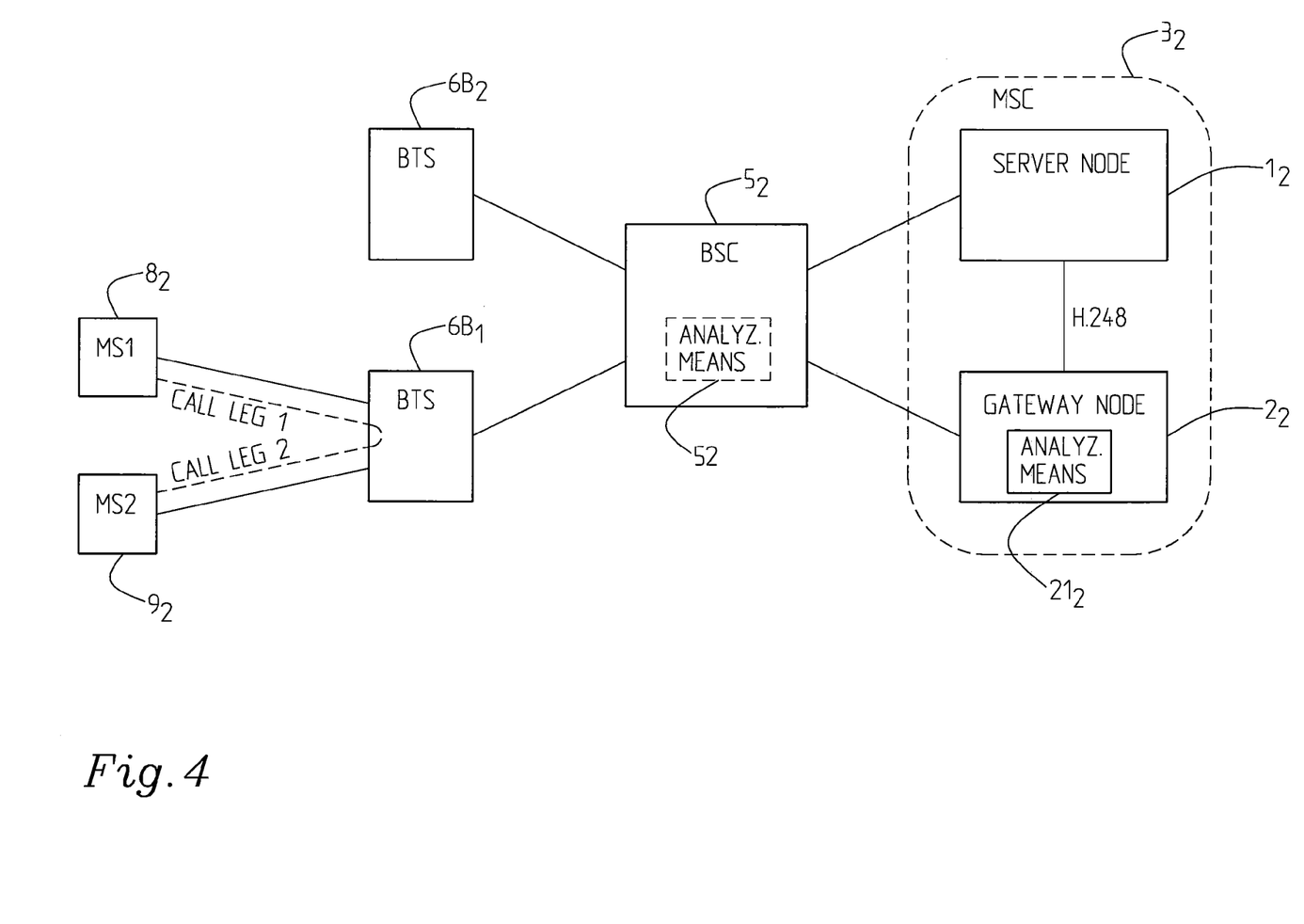
FIG. 4 is a block diagram describing another embodiment of the present invention.

FIG. 4 shows a block diagram of a system similar to that in FIGS. 2 and 3 comprising an MSC $3_2$ split up into a server node $1_2$ and a gateway node $2_2$ comprising analyzing means $21_2$. BSC $5_2$ here controls BTS $6B_2$ and BTS $6B_1$, which handles MS1 $8_2$ and MS2 $9_2$. Thus, the same BTS $6B_1$ handles both MS1 $8_2$ and MS2 $9_2$. In a most advantageous implementation it is possible to perform the local switching already in BTS $6B_1$ (this is also called remote switching). This can be handled in different manners, through additional signalling from BSC to BTS or by introducing analyzing means 52 (shown with dashed lines) in BSC to establish whether one and the same BTS is responsible for MS1 and MS2 or not.

In a GSM scenario, local switching in a BTS or between BTSs could be done using a remote transport node or by means of packet transfer, e.g. using IP technology (Internet Protocol). This means for example that if a BTS is common for both call legs, switching could be done in the BTS or in case different BTSs are used for the call legs by sending payload in for example IP packets directly between the BTSs instead of switching the payload in the BSC. Similarly, it could be done in an external transport node. This relates to alternative implementations that can be advantageous; in the other implementations switching is actually done in the "lowest level" common node for both call legs, meaning the node furthest out in the network that is common for both call legs.

Figure 5:
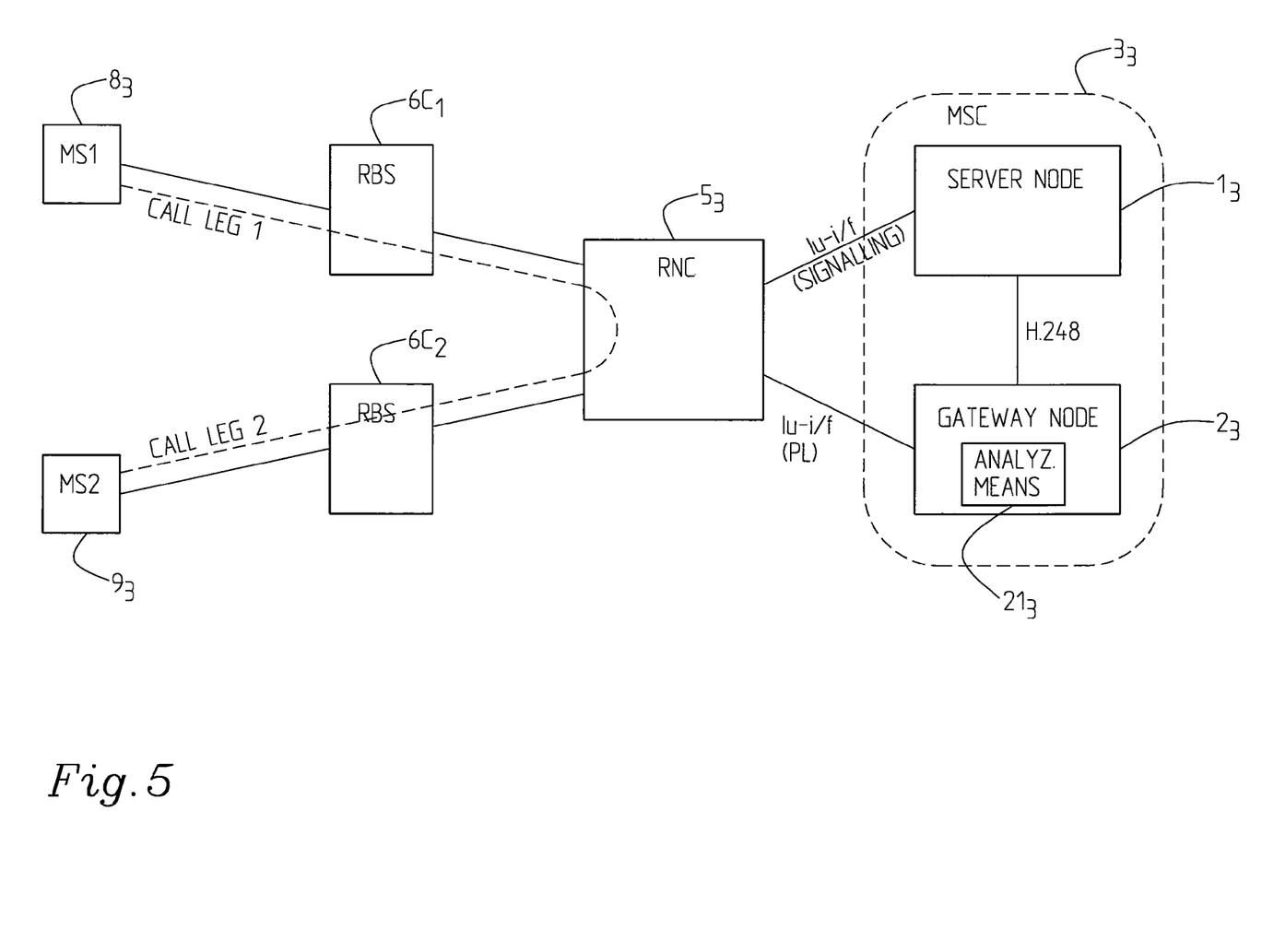
FIG. 5 is a block diagram showing still another embodiment of the present invention.

FIG. 5 shows another implementation of the inventive concept, based on using a 3G radio access network. MSC $3_3$ comprises a server node $1_3$ and a gateway node $2_3$ with analyzing means $21_3$. The radio access network here comprises a number of RNCs, only one RNC $5_3$ being shown, which handles radio base stations RBSs, also called NodeBs, $6C_1$, $6C_2$. RNC $5_3$ communicates or is connected to the server node $1_3$ using the Iu-interface signalling protocols RANAP/DTAP (Radio Access Network Application Part/DTAP) and RNC $5_3$ communicates with the gateway node $2_3$ over the Iu-interface for payload traffic. The functioning is similar to the functioning described above in all other aspects and it is possible to switch the traffic in RNC $5_3$ if MS1 $8_3$ and MS2 $9_3$ are handled by the same RNC. Also in this case it could be possible to, if MS1 $8_3$ and MS2 $9_3$ are handled by the same RBS (NodeB), perform the switching already in the RBS (not shown).

Figure 6:
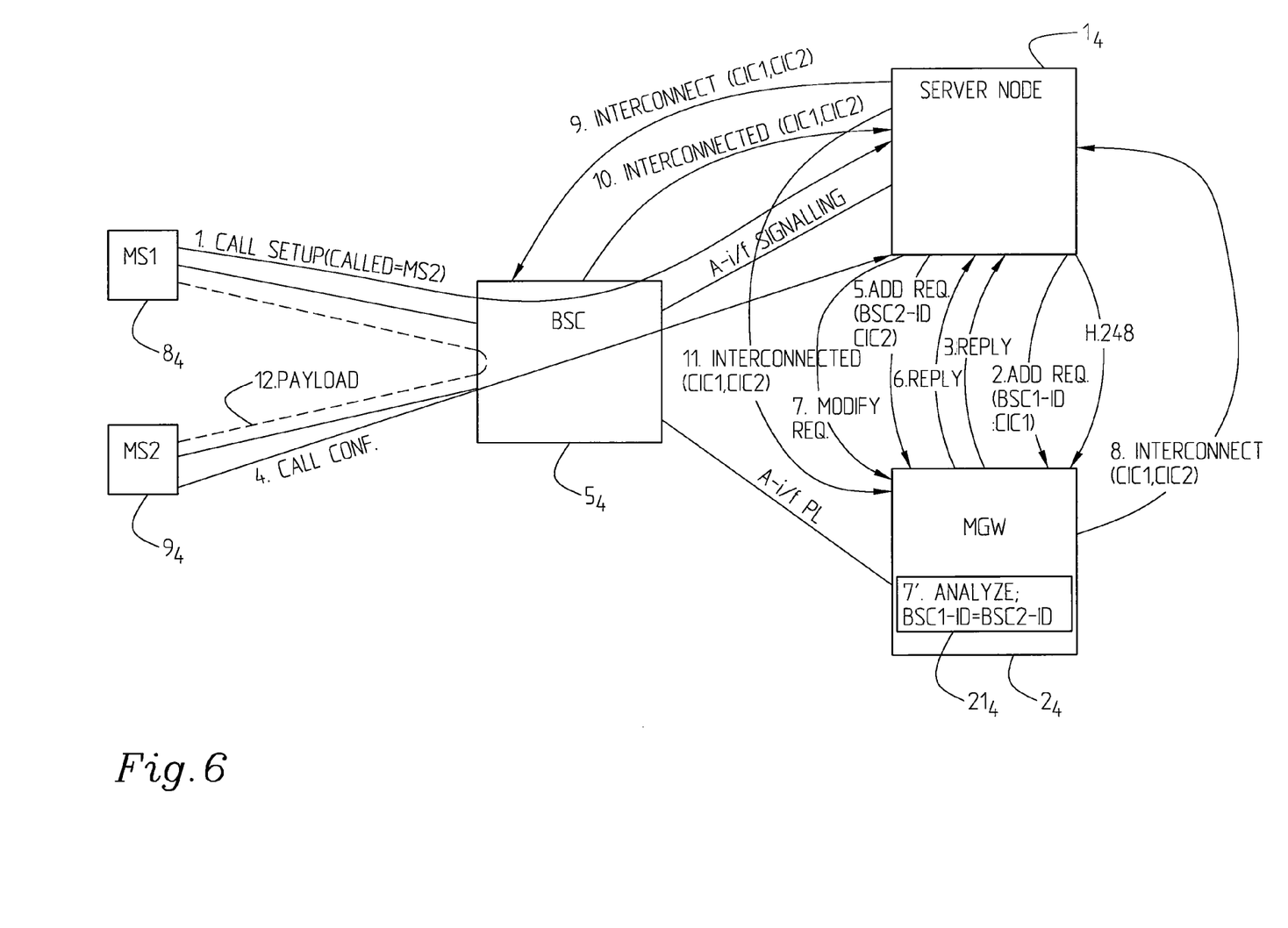
FIG. 6 is a block diagram of a system showing signalling between nodes to provide for local switching.

FIG. 6 is a block diagram describing an embodiment similar to that of FIG. 3 but simplified in so far that the BTSs are not shown which means that MS1 $8_4$ and MS2 $9_4$ can be handled by one and the same BTS or by different BTSs, which is not relevant in this case. The intention with FIG. 6 is to illustrate the signalling in more detail. It is supposed that MS1 $8_4$ will establish a call connection with MS2 $9_4$. In FIG. 6, only BSC $5_4$ is illustrated.

Only messages of interest for the inventive concept are illustrated. MS1 $8_4$ sends a call setup message via BSC $5_4$ to server node $1_4$ among other things containing information about the called number, MSISDN of MS2, 1. The server node $1_4$ obtains information about the BSC 1, BSC-identity, used e.g. from the transmission layer or from the interface used. Then the server node selects a free circuit resource for the first call leg, i.e. a CIC, CIC1, and sends an add request using H.248 to gateway node $2_4$ in a conventional manner, but the message is extended to contain the additional information about BSC 1-id (i.e. the BSC handling MS1) and CIC1, 2. Gateway node $2_4$ returns a reply over H.248 in a conventional manner, 3. After conventional signalling (not shown for reasons of clarity), MS2 $9_4$ sends a call confirmation message to server node $1_4$, 4. The server node $1_4$ obtains information about the BSC 2, BSC-identity, used e.g. from the transmission layer or from the interface used. Then the server node selects a free circuit resource for the second call leg, here CIC2, and the server node $1_4$ sends an add request to gateway node $2_4$ in a conventional manner with the difference that it is extended to also include BSC2-id and CIC2, 5. Gateway $2_4$ returns a reply to server node $1_4$, 6. Preferably after MS2 $9_4$ has responded, the mobile stations are interconnected, and after the server node $1_4$ has sent a modify request with an order to through-connect to the gateway node, 7. It is analysed in analyzing means $21_4$ of gateway node $2_4$ or established whether BSC1-id is the same as BSC2-id. If yes, it initiates sending of an interconnect message to server node $1_4$, 7'. If the BSC is common (handles MS1 and MS2) a new message containing the information that CIC1 and CIC2 should be interconnected is generated in the gateway node and sent to the server node, 8. This is a new message that will be transparently handled by the server node $1_4$, which over BSSMAP forwards the message, i.e. interconnect CIC1, CIC2, to BSC $5_4$, 9. BSC $5_4$ responds with a message indicating interconnected including CIC1, CIC2, 10. Server node $1_4$ then, over H.248, forwards the message transparently to gateway node $2_4$, 11.

After the interconnected indicating message has been sent to gateway node $2_4$ conventional connect signalling is accomplished (not shown) and the common BSC $5_4$ performs the switching of the payload locally, 12.

In an alternative implementation it is supposed that it is already known to the server node (through the first setup message) that MS1 and MS2 are handled by the same BSC, which means that only a triggering of the procedure takes place in the server node (cf. step 7 above) after verification of through connect from the gateway node. The logic may be provided in the gateway node or in the server node.

Figure 7:
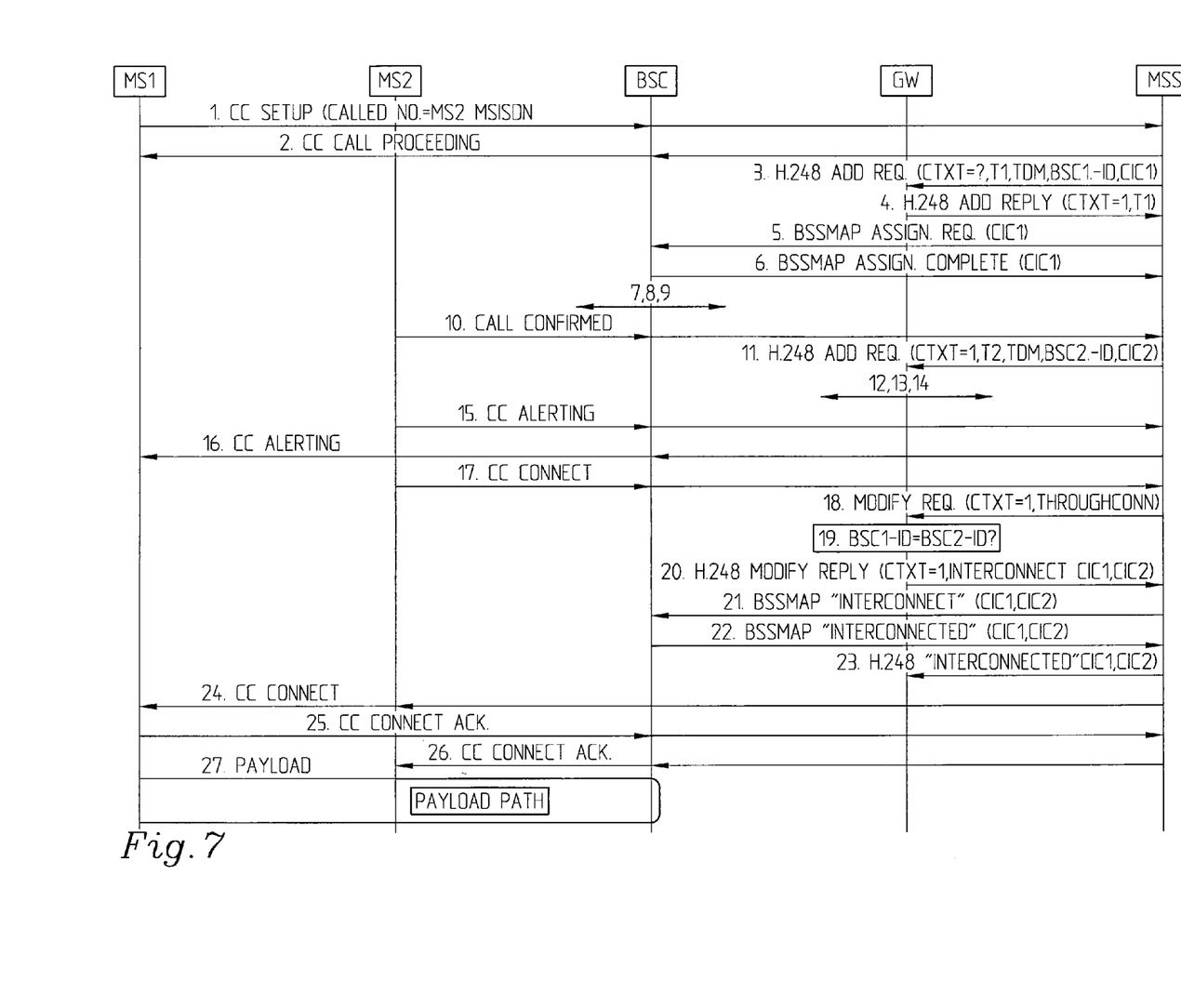
FIG. 7 is a sequence diagram illustrating a signalling sequence procedure according to the present invention.

FIG. 7 is a sequence diagram showing the signalling for an embodiment as shown in FIG. 6 including conventional (cf. 3GPP TS 48.008 for the BSSMAP messages, 3GPP TS 24.008 for the Call Control CC messages) as well as added or extended messages. Normally the BSC and MGW do not communicate with each other, but through introducing signalling between the MGW and the BSC via the MSS, since MSS has established signalling relations with both the BSC and the gateway node, it is possible for BSC to obtain knowledge about the fact that two call legs belong to the same call.

Thus MS1 sends a CC setup message including called number (MS2 MSISDN, Mobile Subscriber ISDN Number), via BSC to MSS, 1. MSS establishes or finds BSC 1-id and selects CIC1 and MSS responds with a CC call proceeding message, 2. MSS then sends an add request message over H.248, in a conventional manner, to the gateway node but the message here also includes information about the identity of the BSC handling MS1 and the reserved CIC information for the first call leg, 3. The gateway node replies in a conventional manner with an add reply message, 4. Also as in a conventional call setup procedure, MSS sends, over BSSMAP, an assignment request including information about CIC1 to the BSC, 5, which responds with an assignment complete message, 6. Via BSC, MSS then sends a paging message (page MS2) over BSSMAP to MS2, which responds with a paging response, 8. Since the details of the paging procedure are not important for the invention, the description of paging has been simplified. Signalling sequences 7, 8, 9 are not shown in detail in the sequence diagram since they are unmodified. Then a CC setup message, 9, is sent to MS2, which responds with a CC call confirmed to MSS, 10. Also for MS2 information is included about BSC 2-id in the conventional messages, i.e. the BSC handling MS2, and CIC2. This information is included in an add request message in MSS which then transparently is provided to the gateway node over H.248, 11.

The gateway node replies with an add reply message to MSS over H.248, 12, and MSS sends a BSSMAP assignment request including information about CIC2 to BSC which responds with an assignment complete message, 12, 13, 14. Signalling sequences 12, 13, 14 are not explicitly shown in FIG. 7, since they correspond to sequences 4, 5, 6, but instead of CIC1 information, CIC2 information is included.

MS2 sends a CC alerting message via BSC to MSS, 15, which forwards the CC alerting to MS1, 16. Finally, when the MS2 answers the call it responds with a CC connect, 17, to MSS. MSS then sends a modify request ordering through-connection to the gateway node, 18, in a conventional manner.

In the gateway node, in the analyzing means, it is then established whether BSC 1 and BSC 2 actually are the same, i.e. whether MS1 and MS2 are handled by the same BSC, 19. This is possible since the gateway node has been provided with information about BSC 1, BSC 2 (and CIC1, CIC2) by means of messages 3 and 11. If BSC 1-id=BSC 2-id, the gateway node generates an extended modify reply message, extended in so far that it contains information that call legs identified by CIC1 and CIC2 should be interconnected, i.e. the gateway node through-connects and sends a new message interconnect CIC1, CIC2 to MSS, 20, i.e. a message which contains information about which CICS belong to the call.

The MSS then forwards the interconnect message to the common BSC over BSSMAP, 21. The BSC responds with a message interconnected (CIC1, CIC2) to MSS, 22. If the BSC supports interconnection of CIC1 and CIC2, it forwards replies with the interconnected message to MSS, 22. If the speech coding used for the two call legs is the same, the transcoders can be released in BSC. The gateway node can now break up the connection and knows that the BSC has taken care of the interconnection. Subsequently conventional connect signalling takes place, 24, 25, 26, and the payload is switched via BSC instead of via the gateway node, 27.

Figure 8:
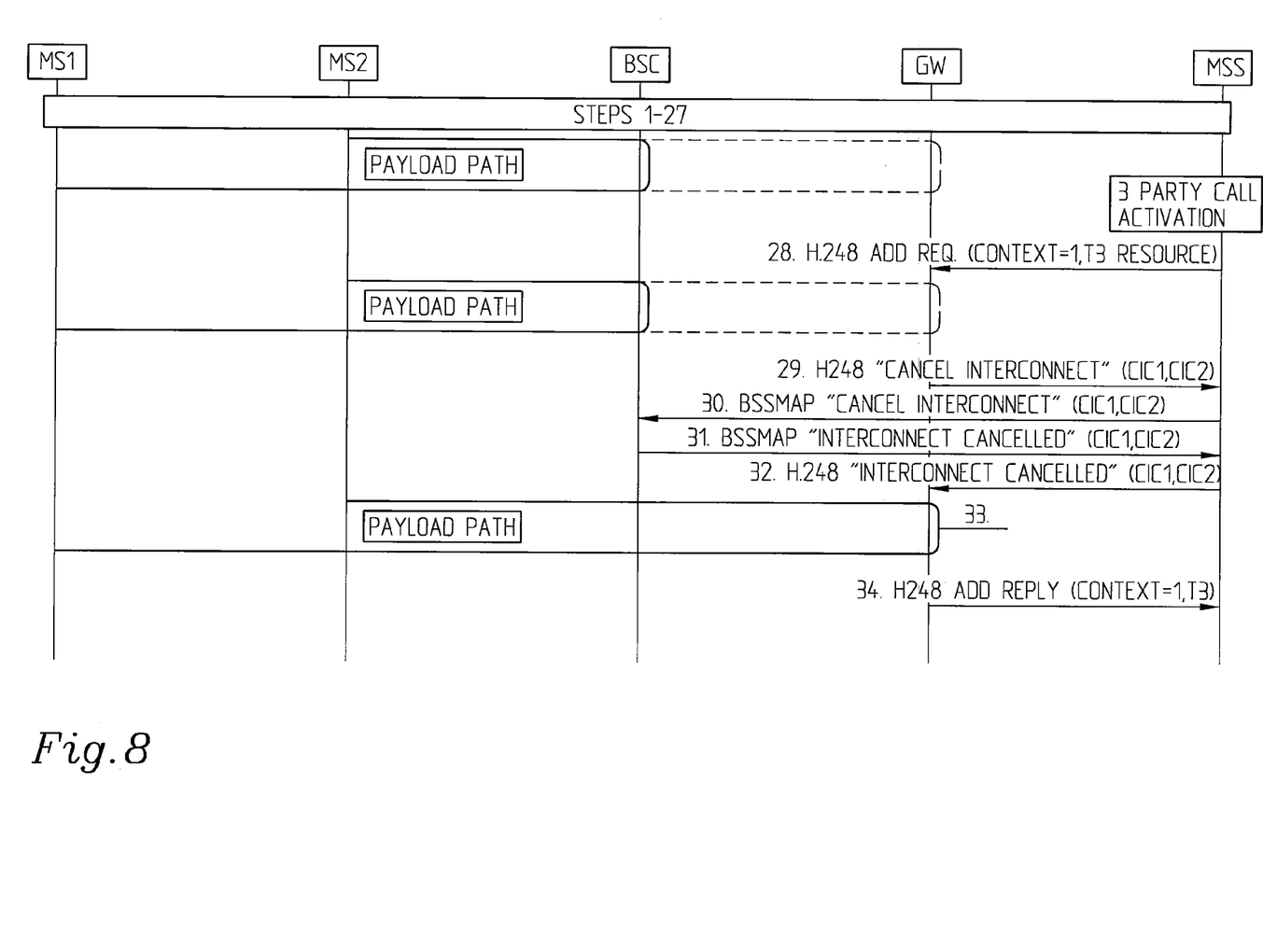
FIG. 8 is a sequence diagram illustrating a particular implementation for cancellation of an interconnected state according to the present invention.

If gateway resources are needed during a call switched in BSC, for example to setup a conference bridge, the voice path can be redirected to the gateway node. A message interconnect cancel is then embedded in a reply from the gateway node and the MSS forwards it as a new BSSMAP message to the BSC. This is schematically illustrated in the sequence diagram of FIG. 8. It is supposed that steps 1-27 discussed with reference to FIG. 7 already have been taken and that the payload path from MS1 to MS2 goes via BSC instead of via MGW illustrated through dashed lines. If for example a three party call activation takes place in MSS, a conventional add request message is sent to gateway node, 28. Knowing that switching is done in BSC, the gateway node sends a cancel interconnect message including information of CIC1 and CIC2 to MSS, 29, which transparently forwards the cancel interconnect message over BSSMAP to BSC, 30, which cancels the interconnect done in the BSC, or in the used BTS's, 40, the BSC then sends a message interconnect cancelled to MSS, 31 which, transparently, forwards the interconnect cancelled to the gateway node, 31. The payload path is then switched in the gateway node instead, 33. Finally a conventional add reply message is sent to MSS from the gateway node, 34, verifying the setup of the 3$^{rd}$ party call.

Figure 9:
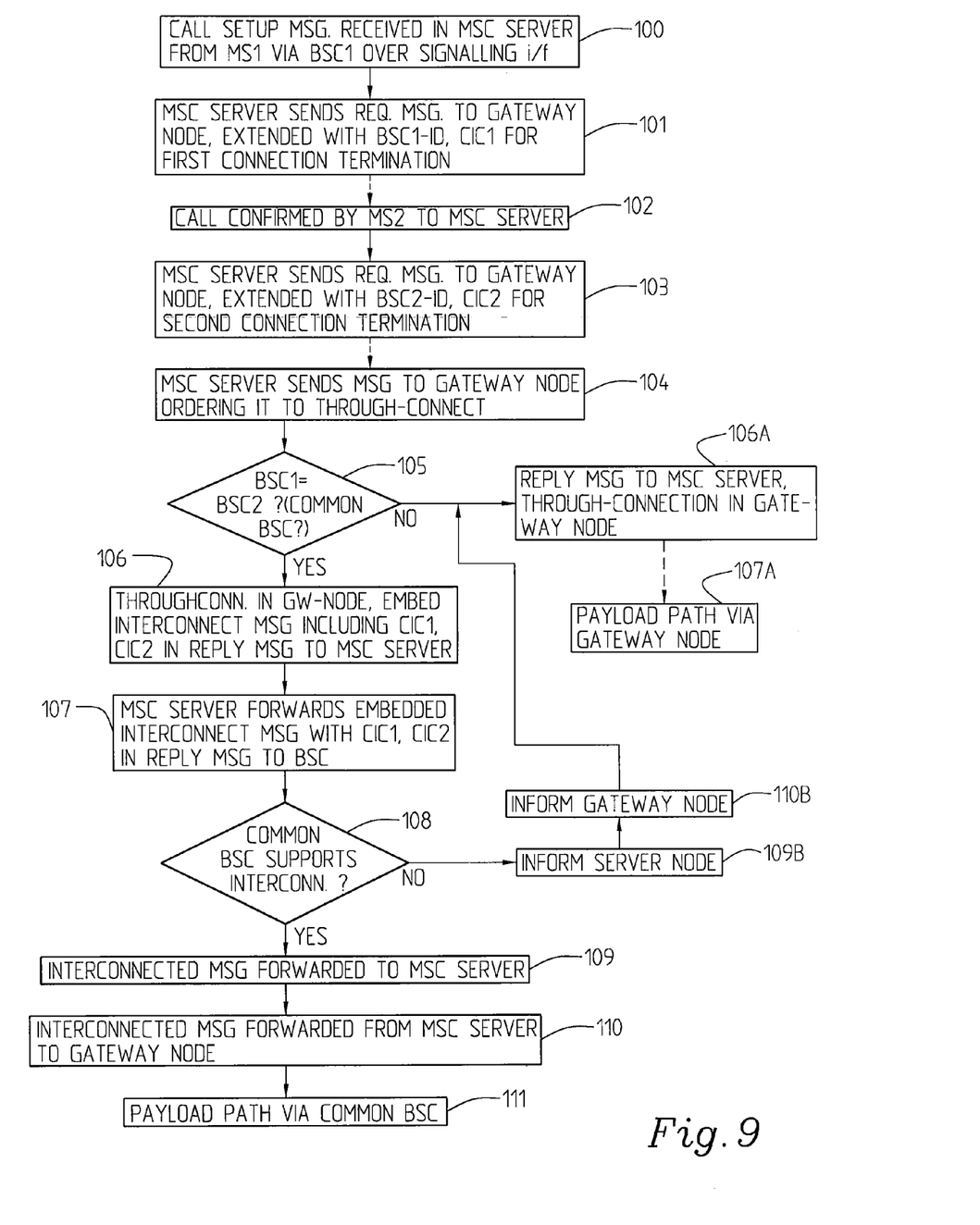
FIG. 9 is a flow diagram describing the procedure according to one embodiment of the invention.

FIG. 9 is a flow diagram describing the inventive procedure according to one particular implementation. It should be clear that only the steps significant for the functioning of the present invention are shown. The procedure starts with reception of a call setup message in an MSC server from MS1 via BSC 1 over a signalling interface, 100. MSC server knows which is the BSC and selects CIC and sends a request message to the gateway node extended with BSC 1-id and CIC1 for the first connection termination, 101. After conventional signalling, the call is confirmed by MS2 to MSC server 102, also here MSC has information about the BSC, here called BSC 2, handling MS2, and selects CIC2 for the second connection termination. MSC server, as above, sends a request message to the gateway node extended with BSC 2-id and CIC2, 103. After conventional signalling between MSC server and BSC and MS1, MS2, MSC server sends a message to the gateway node ordering it to throughconnect, 104.

It should be clear that if MS1 and MS2 are handled by different BSCs, switching is done via the respective BSCs. Alternatively it is supposed to be known by MSC server and BSC that it is a common BSC; only the gateway node being unaware of this fact. However, since the gateway now has information about BSC 1 and BSC 2 identity, an analyze is done to establish if BSC 1 is equal to BSC 2, or if a common BSC is used, 105. If not, a reply message is sent to MSC server and through-connection is done in the gateway node, 106A, and the payload path will go via the gateway node, 107A.

If it is established in the gateway node that it is a common BSC, a through-connection is done in the gateway node and an interconnect message including CIC1, CIC2 is embedded in a reply message to MSC server, 106. MSC server forwards the embedded interconnect message with CIC1, CIC2 in a message to the common BSC, 107. It is also established if the common BSC supports the interconnection for this call, 108. If not, the server node is informed, 109B, which in turn informs the gateway node, 110B which provides a reply message to MSC server and through-connects, 106A, 107A. If common BSC supports the connection, a message indicating interconnected including CIC1, CIC2 is forwarded transparently to MSC server, 109, and the interconnected message is then in turn transparently forwarded from MSC server to the gateway node, 110, and the payload path is set up via common BSC, 111.

It should be clear that the invention is not limited to the specifically illustrated embodiments, but that it can be varied in a number of ways within the scope of the appended claims. Particularly it can be applied in different access networks and different nodes with a similar functionality as the nodes described above.

The invention claimed is:

1. A network node arrangement comprising:
    a server node adapted to handle control signaling for circuit switched calls and control connections between mobile stations over a radio network; and
    a gateway node adapted to handle user plane traffic under control of said server node, wherein
    said server node is adapted to, for a first and second call leg of a requested call between a first mobile station and a second mobile station, provide information to said gateway node about radio network node handling of said first call leg and said second call leg and channel or circuit information about channel or circuit resources for said first and second call legs,
    wherein said gateway node further comprises analyzing means comprising switching path optimization logic and being adapted to detect that for said requested call that said first and second mobile stations are handled by a common radio network node and triggering generation means adapted to provide an interconnection information message to said server node including information about said channel or circuit resources for said first and second call legs, said server node being adapted to forward said interconnection information message to said common radio network node such that said gateway node can used said interconnection information message to determine whether switching of said user plane traffic may be performed in said common radio network node.

2. The network node arrangement according to claim 1, wherein said server node comprises a mobile switching center (MSC) server.

3. The network node arrangement according to claim 1, wherein said gateway node comprises a media gateway (MGW).

4. The network node arrangement according to claim 1, wherein said server node is adapted to control a radio access network (RAN) comprising a base station subsystem (BSS)

with a number of base station controllers (BSCs), each controlling a number of base stations or base station transceivers (BTSs).

5. The network node arrangement according to claim 1, wherein said server node is adapted to control a radio access network (RAN) comprising a number of radio network controllers (RNCs), each controlling a number of Node-Bs.

6. The network node arrangement according to claim 1, wherein said server node is adapted to provide information about said common radio network node and channel or circuit resources for said first and second call leg of said requested call established and selected after reception of messages sent during a setup procedure for said requested call.

7. The network node arrangement according to claim 6, wherein said information about said common radio network node comprises identity information for identifying at least one base station controller (BSC) or radio network controller (RNC) handling said first and second mobile station and first and second packet flow identifier, respectively.

8. The network node arrangement according to claim 1, wherein said analyzing means of said gateway node are adapted to compare received first radio network node identity of said first call leg and received second radio network node identity of said second call leg and to, if said received first radio network node identity is equal to said received second network node identity confirming said common radio network node, generate said interconnection information message and provide said interconnection information message to said server node.

9. The network node arrangement according to claim 8, wherein said interconnection information message comprises information about said channel or circuit resources for said first and second call legs.

10. The network node arrangement according to claim 9, wherein said analyzing means of said gateway node are adapted to activate or communicate with said triggering generation means for generation of said interconnection information message after reception of a message from said server node concerning a modification request relating to through-connection.

11. The network node arrangement according to claim 10 wherein said server node is adapted to transparently transfer said interconnection information message to said common radio network node.

12. The network node arrangement according to claim 11, wherein said server node is adapted to generate said interconnection information message and to send said interconnection information message to said common radio network node and to forward a verification reply message from said common radio network node indicating interconnected status, to said gateway node.

13. The network node arrangement according to claim 1, wherein said analyzing means of said gateway node or of said common radio network node are adapted to establish if said first and second call leg are handled by a secondary common radio network node to said first and second call legs and located closer to respective terminations than said common radio network node, and said analyzing means being adapted to generate said interconnection information message enabling payload switching through such secondary common radio network node.

14. The network node arrangement according to claim 13, wherein said secondary common radio network node is a radio base station, a base station transceiver (BTS) or a Node-B.

15. The network node arrangement according to claim 1, wherein said common radio network node is adapted to switch said user plane traffic locally and comprises transcoder disconnecting means for disconnection transcoder units if said first and second mobile stations use similar coding for local user plane traffic switching.

16. A method for handling a call connection between a first mobile station and a second mobile station, said call connection including a first call leg or connection termination over a first radio network node and a second call leg or connection termination over a second radio network node, comprising:
providing information related to said first radio network node and said second radio network node handling said first and the second call legs, respectively, of said call connection involving said first mobile station and said second mobile station to a core network gateway node in respective request messages,
analyzing, in said core network gateway node comprising switching path optimization logic, that said first and second call legs are handled by a common radio network node,
generating an interconnection information message in said core network gateway node,
sending said interconnection information message to a server node,
transparently transferring said interconnection information message from said server node to said common radio network node, and
wherein said interconnection information message determines whether switching of user plane traffic may be performed in said common radio network node.

17. The method according to claim 16, further comprising:
establishing in said common radio network node, at reception of said interconnection information message, if said common radio network node is able to perform an interconnection;
if yes,
providing a verification response message to said server node; and
forwarding at reception of said verification response message in said server node, said verification response message to said core network gateway node.

18. The method according to claim 16, wherein said providing information comprises:
providing a first request message comprising or enabling finding first radio network node identity,
providing a second request message comprising or enabling finding second radio network node identity, and
selecting a first channel or circuit resource for said first call leg and a second channel or circuit resource for said second call leg in said server node.

19. The method according to claim 16, wherein said generating said interconnection information message comprises:
generating said interconnect information message upon or after reception of a connect message from said second mobile station.

20. The method according to claim 16, further comprising:
performing said analyzing when said first and second mobile stations have been through-connected.

21. The method according to claim 16, further comprising:
transparently transferring said interconnect information message with first and second packet flow identities as an extended base station subsystem management application part (BSSMAP) or radio access network application part (RANAP) message from said server node to said common radio network node;
providing said extended BSSMAP/RANAP message as a response message indicating that said first and second call legs are interconnected in said common radio network node to said server node, transparently transferring said interconnection information message to said core network gateway node, and switching user traffic of said call connection in said common radio network node.

22. The method according to claim 16, further comprising:

providing information from said server node to said core network gateway node that traffic resources are needed in said core network gateway node, generating said interconnection information message comprising a cancel interconnect message in said core network gateway node, and sending said cancel interconnect message to said server node, transparently forwarding said cancel interconnect message to said common radio network node and to said core network gateway node, and switching user plane traffic via said core network gateway node.

* * * * *